Feb. 17, 1931. J. MAHLER 1,793,234
SPRAYING NOZZLE
Filed April 11, 1925

Inventor
Johann Mahler
By
Marshal and Fehr
Attorneys

Patented Feb. 17, 1931

1,793,234

UNITED STATES PATENT OFFICE

JOHANN MAHLER, OF AUGSBURG, GERMANY, ASSIGNOR TO THE FIRM: MASCHINEN-FABRIK AUGSBURG-NUERNBERG, AKTIENGESELLSCHAFT, OF AUGSBURG, GERMANY, A CORPORATION OF GERMANY

SPRAYING NOZZLE

Application filed April 11, 1925, Serial No. 22,376, and in Germany July 12, 1924.

In combustion engines operating on the principle of injecting the fuel in sprayed condition without admixture of air (solid injection) it is known to insert the spraying nozzle into a corresponding bore of the cylinder cover and fasten the same therein by means of a flange which is screwed thereupon. The conduit leading from the fuel pump to the spraying nozzle is thereby carried through a bore of the flange and immediately connected to the nozzle. This arrangement, while not being objectionable for stationary engines, has certain disadvantages when employed with vehicle motors, irrespective of their character as land or water vehicle. These disadvantages consist in that the exchange of the nozzle takes quite some time and is also inconvenient in other respects. For with previously known constructions if either the nozzle or the nozzle plate becomes clogged up the fuel supply must be interrupted to permit cleaning or the removal of the clogged parts and the substitution of new parts therefor. This as well as the re-adjusting of a new nozzle-plate, however, will always cause a longer interruption of the travel. In addition to this, if the necessary tools are not at hand, the exchange may not at all be carried out on the road.

These disadvantages are obviated by this invention by connecting the supply conduit for the fuel not immediately to the nozzle, which is inserted as a whole into the cylinder head, and by having this conduit terminate in the fastening flange and connecting it with the central channel of the nozzle leading to the nozzle plate by means of a special bore provided in the fastening flange. By this it will be possible merely by unscrewing the flange to fully expose the nozzle so that it may be taken out cleaned and exchanged against a substitute nozzle carried as a reserve. This exchanging of the nozzle or the nozzle-plate may be accomplished by only a few manipulations, so that a long interruption of the travel will not take place.

Figure 1:
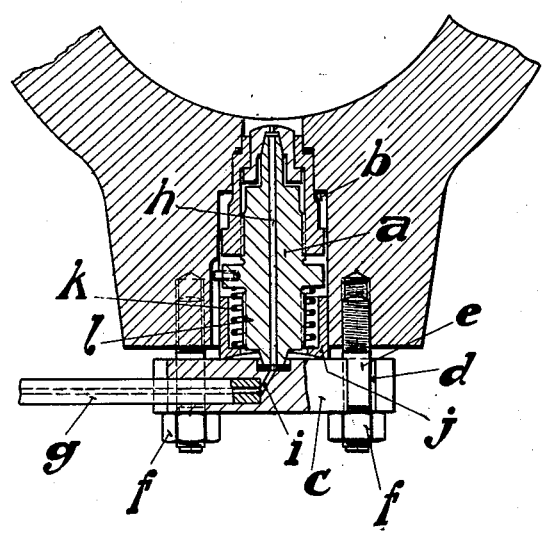
Figure 3:
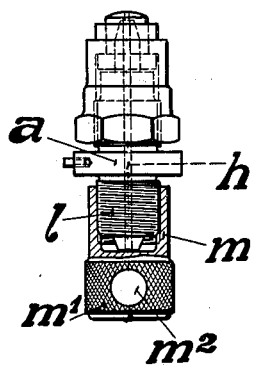
Figure 2:
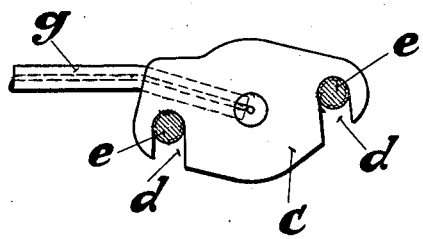

In the accompanying drawing an example of the nozzle according to this invention is shown in connection with a motor having an arrangement for lateral injection of the fuel. Fig. 1 shows a cross-section through the cylinder head with the nozzle provided thereon in condition ready for operation, Fig. 2 is a top view of the fastening flange and Fig. 3 shows a reserve nozzle. The spraying nozzle $a$ is of the usual construction and loosely inserted into the recess $b$ provided in the cylinder head. The nozzle is fastened to the cylinder by the fastening flange $c$, overlapping the screw bolts $e$ which pass through slots $d$ in the flange, which slots open in the same direction, and through the same side of the flange. The latter is pressed by means of the nuts $f$ against the middle part of the nozzle. The fuel supplying conduit $g$ coming from the fuel pump terminates at the flange $c$ and is in connection with the central channel $h$ of the nozzle leading to the nozzle-plate by means of a bore $i$ provided in the flange. In order to afford a protection against the entrance of dust, especially in case of motors for land vehicles, or against entrance of any foreign particles into the nozzle bore of the cylinder, which would cause a great trouble in case a quick exchange of the nozzle becomes necessary, the spraying nozzle is surrounded at its outer end by a protective ring $j$, which is continuously pressed by a spring $k$ against the interior side of the flange $c$. A suitable packing $n$ is mounted upon the inner face of the flange $c$, to cooperate with the outer end of the nozzle, to further afford protection against the entrance of dust and the like. For properly taking off the nozzle it will be sufficient to unscrew the nuts $f$ to such an extent, that the flange $c$ may be lifted from the screw bolts $e$ by somewhat bending the conduit $g$, which on account of its length is slightly flexible, the flange being moved laterally from its normal assembled position overlying the nozzle.

The spraying nozzle is then exposed so that it may be readily taken out and exchanged for a reserve nozzle. In order to prevent the entrance of dirt into the fuel channel $h$ of the reserve nozzle, which is carried with the vehicle, and to facilitate the taking off and the insertion of the nozzle, the outer end of the latter is provided with a thread $l$ upon which a cap $m$ may be screwed, which is provided at its exterior part with a milled surface $m_1$. A transverse bore $m_2$ is further provided therein, as shown in Fig. 3. The latter serves for the insertion of a pin, by means of which the nozzle may be withdrawn from its seat. If, on the other hand, the nozzle is introduced into its seat, the cap $m$ is unscrewed and the protective ring $j$ with the spring $k$ inserted, whereupon the flange $e$ is swung over the screw bolts $e$ and firmly pressed against the nozzle by drawing tight the nuts $f$. In this position the bore $i$ will again establish the connection between the conduit for the supply of fuel and the central canal $h$ of the nozzle.

I claim:

1. In combination with a spraying nozzle, a central channel therein, a cap mounted detachably upon the outer end of said nozzle, said cap providing a closed cup surrounding and protecting the outer orifice of said channel against the entrance of foreign matter and also forming a handle to facilitate the insertion and the removal of said nozzle.

2. In combination with a spraying nozzle, a protective ring surrounding the rear part of the nozzle after its insertion into the cylinder of the engine, a fastening flange for fastening the nozzle upon the cylinder, and a spring adapted to permanently press said protective ring against the interior side of said flange.

3. In apparatus of the character described the combination with an engine cylinder having a nozzle receiving recess; of a spraying nozzle having a fuel passage therein positioned fixed within said recess, a separate retaining flange for said nozzle, having bolt receiving slots therein, and fastening screw bolts attached to the engine cylinder and positioned within the said slots, the construction being such that the flange may be removed by lateral motion from overlying the nozzle receiving recess, and a fuel supply conduit extending from a side edge portion of said flange and in communication with the fuel passage in said nozzle.

4. In apparatus of the character described, an engine cylinder having a nozzle receiving recess therein, a unitary spraying nozzle structure positioned fixed within said recess, and means for removably securing said nozzle structure in the recess, comprising a retaining flange contacting with said nozzle structure and lying entirely outside of said recess, means for detachably fastening said flange to the engine cylinder, and a fuel supplying conduit connected to a side edge portion of said flange, said fuel supplying conduit being sufficiently flexible to permit displacement of the flange to one side of the nozzle receiving recess to thus permit removal and replacement of the unitary nozzle structure.

5. In apparatus of the character described the combination with an engine cylinder having a nozzle receiving recess; of a spraying nozzle positioned fixed within said recess, a retaining flange for said nozzle having slots therein opening through the same side of the flange, screw bolts with retaining nuts thereon mounted in the engine cylinder and passing through said slots to normally retain the flange in position to hold the nozzle in the nozzle receiving recess, and a fuel supplying conduit for said nozzle connected with said flange, said fuel supplying conduit being flexible, the construction being such that lateral motion of the flange from its normal retaining position will be permitted to permit removal of the nozzle.

6. In apparatus of the character described, the combination with an engine cylinder having a nozzle receiving recess, of a unitary spraying nozzle structure having a fuel passage therein positioned within said recess, means for retaining said unitary nozzle structure fixed in operative position within said recess comprising a separate retaining flange overlying said nozzle receiving recess so as to be entirely outside thereof and bearing against said unitary nozzle structure, said flange having a fuel passage therein, detachable means for fastening said flange to the engine cylinder with the fuel passage in said flange in register with the fuel passage in said unitary nozzle structure, and a fuel supplying conduit connected to said flange and in communication with the fuel passage therein, said fuel supplying conduit being sufficiently flexible to permit displacement of the flange from overlying the nozzle receiving recess to permit exchange of said unitary nozzle structure without breaking any connections in said fuel supplying conduit.

7. In apparatus of the character described the combination with an engine cylinder having a nozzle receiving recess, of a spraying nozzle having a fuel passage therein positioned fixed within said recess, a retaining flange for said nozzle having a fuel passage therein, means for detachably fastening said flange to the engine cylinder with said flange bearing against said nozzle and with the fuel passage in said flange in register with the fuel passage in said nozzle, a fuel supplying conduit connected to the said flange and the fuel passage therein, and a dust excluding member surrounding said nozzle and bearing against said flange about the connection of the fuel passage in said nozzle with the fuel passage in said flange.

8. In an apparatus of the character described, the combination with an engine cylinder having a nozzle receiving recess, of a spraying nozzle having a fuel passage therein, positioned fixed within said recess with its outer end approximately flush with the engine cylinder adjacent said recess, a separate retaining flange for said nozzle having its inner surface adapted to abut the central portion of the end of the nozzle at a point approximately flush with the engine cylinder adjacent the recess, a fuel supplying conduit connected to a side edge portion of said flange and in communication with the fuel passage in the nozzle, and means for removably fastening the flange to the engine cylinder adjacent said recess, the construction being such that the flange may be removed by radial motion away from the nozzle axis without substantially moving the flange in the direction along the nozzle axis.

9. In an apparatus of the character described, an engine cylinder having a nozzle receiving recess, a unitary injection nozzle structure positioned within said recess with its outer end approximately even with the outer end of the recess, means for retaining the nozzle structure in the recess, said nozzle structure having its outer end externally threaded with the threads spaced from the adjacent wall of the recess for the purpose described.

10. In an apparatus of the character described, an engine cylinder having a nozzle receiving recess, a unitary injection nozzle structure positioned within said recess with its outer end approximately even with the outer end of the recess, said nozzle structure having its outer end externally threaded with the threads spaced from the adjacent wall of the recess, and a removable cap mounted on said threads and entirely closing the outer end of the nozzle structure.

In testimony whereof I have affixed my signature.

JOHANN MAHLER.